March 15, 1949.  C. A. MAXWELL ET AL  2,464,248
STRESS RELIEVING METHOD
Filed Oct. 5, 1944  3 Sheets-Sheet 1

INVENTORS
Carl A. Maxwell
John P. Craven
BY
H. Holbrook
ATTORNEY

March 15, 1949.　　　C. A. MAXWELL ET AL　　　2,464,248
STRESS RELIEVING METHOD
Filed Oct. 5, 1944　　　3 Sheets-Sheet 2
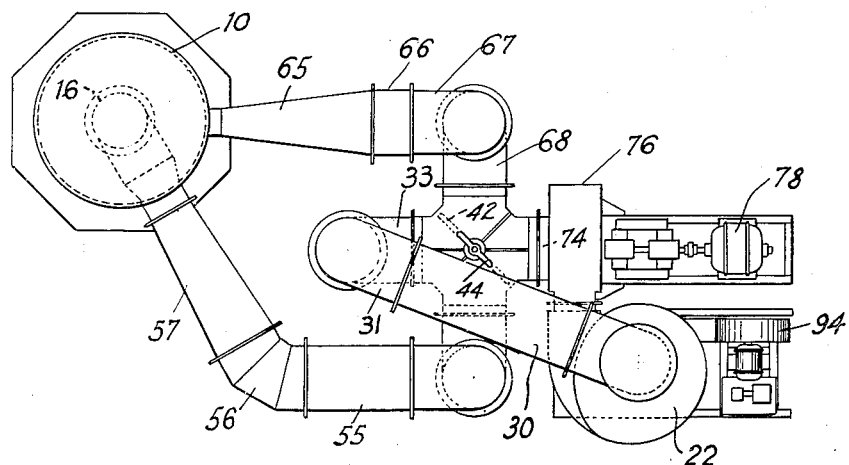
Fig. 2
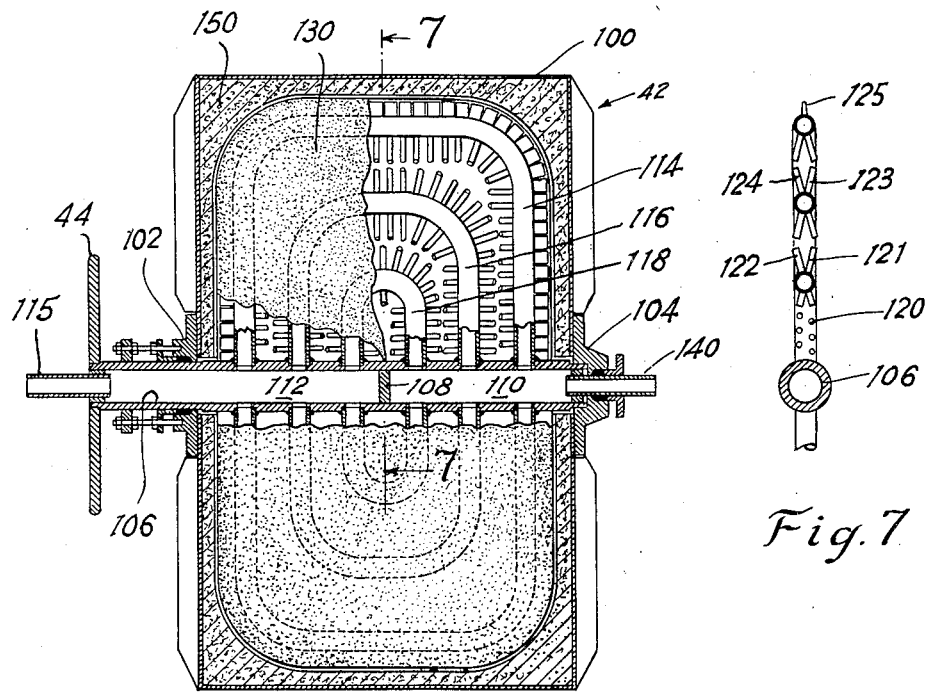
Fig. 6
Fig. 7
INVENTORS
Carl A. Maxwell &
John P. Craven
BY
ATTORNEY Patented Mar. 15, 1949

2,464,248

UNITED STATES PATENT OFFICE 2,464,248

STRESS RELIEVING METHOD

Carl A. Maxwell and John P. Craven, Akron, Ohio, assignors to The Babcock & Wilcox Company, Rockleigh, N. J., a corporation of New Jersey Application October 5, 1944, Serial No. 557,328

5 Claims. (Cl. 148—13)

1

This invention relates to apparatus for, and method of, effecting the stress-relieving heat treatment of welded pressure vessels.

The invention is more particularly concerned with the stress-relieving heat treatment of large pressure vessels after they are in operative position.

Many manufacturing processes in the field of industrial chemistry require welded pressure vessels of large size. This characteristic, together with the fact that many of these vessels are so constructed and set so that they tower to considerable heights, demands a mode of erection involving the welding together of sections of the vessel in the field. This procedure makes subsequent stress-relieving difficult and eliminates the use of a fixed stress-relieving furnace in which pressure vessels may be treated in seriatim.

Furthermore, the expense of building a large knock-down stress-relieving furnace towering more than 100 feet above the earth, and for erection about different pressure vessels, successively, would be prohibitive.

The general object of this invention is to overcome these difficulties, providing a novel method of stress-relieving pressure vessels in the field.

A further object of the invention is to accomplish the field stress-relieving of pressure vessels while maintaining the time-temperature and temperature gradient schedule limitations of the particular stress-relieving procedure imposed by the characteristics of the pressure vessel metal.

The invention will be described with reference to the operation and construction of the apparatus shown in the accompanying drawings, and other objects of the invention will appear as the description proceeds.

In the drawings:

Fig. 2 is a plan of the apparatus shown in Fig. 1;

Fig. 6 is a transverse vertical section on the line 6—6 of Fig. 5, showing the structure of the reversing valve or damper; and Fig. 7 is a fragmentary section of the reversing damper taken on the line 7—7 of Fig. 6, and looking into the direction of the arrows.

2

Figures 1, 5:
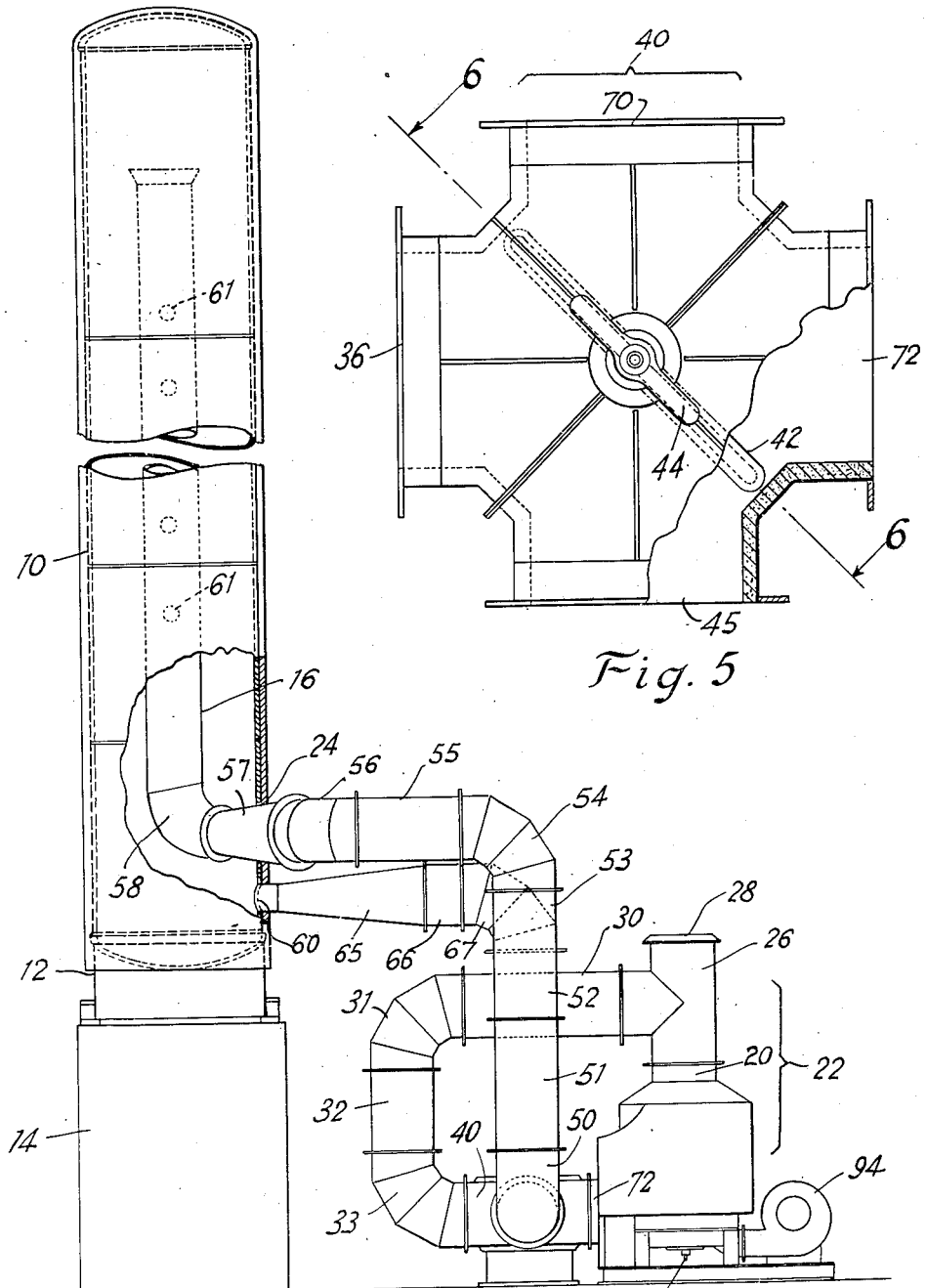
Fig. 1 is an elevation showing the apparatus in operative relation to a pressure vessel to be stress-relieved.
Fig. 5 is a plan of the reversing damper construction.

The pressure vessel 10 of Fig. 1 is of a type used in the manufacture of one of the petroleum derivatives used in the production of synthetic rubber. Its diameter is of the order of 15 feet; its wall construction is of steel plate of a thickness of the order of two inches; and the height of the pressure vessel itself is in excess of 150 feet. With the height of the skirt 12 and base 14 added, the total height of the pressure vessel installation is in the range of 180-200 feet. The erection of such pressure vessels in the field necessitates the joining of sections by welding, and this procedure necessitates subsequent stress-relieving of the pressure vessel before its use under conditions involving substantial temperatures or pressures or both.

For such stress-relieving, our invention involves a large diameter gas distributing duct 16, temporarily fixed centrally of the pressure vessel, and the duct 16 has openings distributed along its length to cause a distribution of some of the incoming heating gases along the length of the pressure vessel.

The top of the duct 16 terminates at a position substantially spaced from the top of the pressure vessel but near enough thereto to prevent stagnation of gases in the top of the pressure vessel during the circulation of the stress-relieving gas.

Associated with the lower end of this duct 16 there is piping or duct-work extending through a nozzle or other opening 24 in the bottom of the pressure vessel and connected to the gas outlet of a furnace 22. This duct work involves a T 26 disposed above the furnace as indicated in Fig. 1. This construction conveniently provides for an explosion door 28 at the top of the T 26, and also provides for necessary access to the furnace for inspection or repair.

From the outlet of the T 26, duct sections 30—30 lead to the port 36 of the reversing damper construction indicated generally at 40 in Fig. 5.

With the reversing damper 42 set by its manually operable controller 44 in the position indicated in Fig. 5, the flow of gases will be from the port 36 to the port 46 and thence through the duct sections 50—50 through to the inlet of the distributing duct 16.

As the gases flow upwardly in the duct 16, a part of the gases (for example 25%) is distributed along the length of the pressure vessel through the openings 61 in the duct, but the major part of the gases passes through the duct to the upper end of the pressure vessel. The gases then turn and pass downwardly between the duct 16 and the pressure vessel walls, to an opening 60 connected by the duct sections 65—68 with the port 70 of the reversing damper construction. The gas flow continues through the reversing damper and out through the port 72, which is directly connected to the inlet 74 of the circulating fan 76 driven by the motor 78.

When the gases move through the gas circuit in the manner described, heat transfer takes place through the metallic walls of the duct 16. The gases are at their highest temperature near the inlet of the duct, and as the gas flow continues, the tendency is for the metal in this zone to obtain an undesirably high temperature. This tendency is alleviated or compensated by the transmission of heat to the duct metal in the gas inlet zone, and the retransmission of heat from that metal to the shell of the pressure vessel and to the cooler gases exteriorly of the duct and near the gas outlet zone. This action, in combination with the gas flow outwardly through the openings in the duct results in increased temperature of the gases near the gas outlet zone and produces a more uniform gas temperature at positions spaced longitudinally of the shell of the pressure vessel.

When the direction of gas circulation is reversed the duct walls near the gas inlet will act to transmit heat to the gases approaching the outlet by reason of the fact that the duct at this position is surrounded by the inlet gases at high temperature. In this case, the absorption of heat by the duct walls from the surrounding gases tends to equalize gas temperatures, preventing excessively high metal temperatures in the zone of the gas inlet. These temperature equalizing actions improve the stress-relieving process, and reduce the frequency of gas flow reversals.

Figure 4:
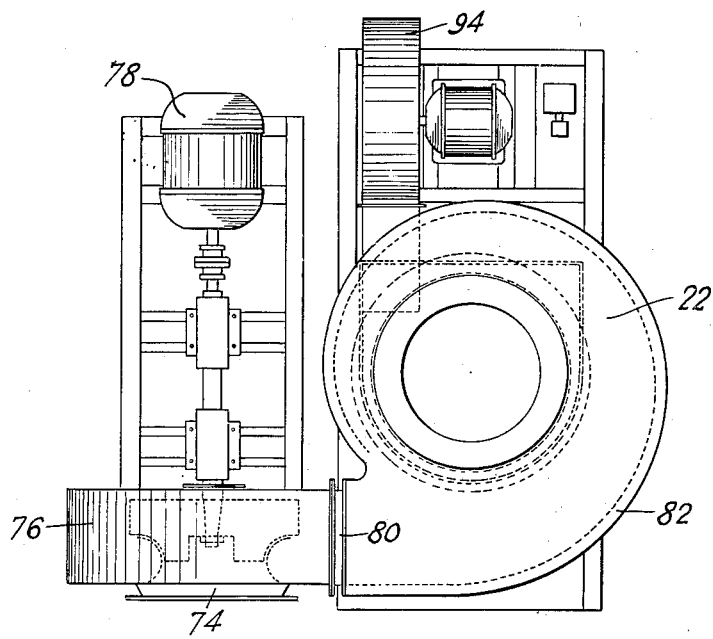
Fig. 4 is a plan of the furnace and circulating fan unit shown in Fig. 3.
Figure 3:
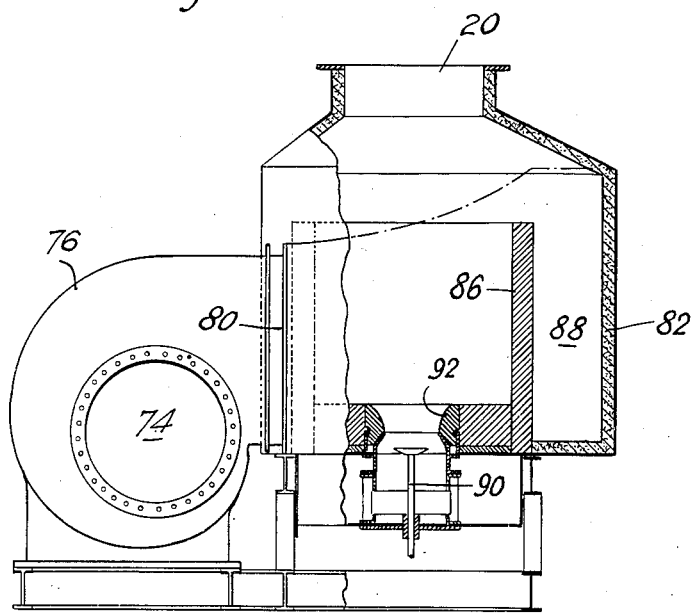
Fig. 3 is a view showing the furnace in vertical section, and indicating the relationship of the furnace and the circulating fan.

The outlet of the circulating fan 76 is directly connected to the inlet 80 of the outer furnace casing 82, which is shaped as indicated in Fig. 4. The circular combustion chamber 86 is disposed within the outer furnace casing 82 so as to distribute the incoming circulating gases around the combustion chamber through the gradually restricted passage 88 between the outer wall of the casing 82 and the combustion chamber 86. The mixed circulating gases, and make-up gases from the combustion chamber 86 pass upwardly to the furnace outlet 20, and the circulation of the gases continues in this manner until the burner 90 is shut off or until the damper 42 is moved by its controller 44 to a position at right angles to the position in which it is shown in Fig. 5. When this is done, the flow of the heating gases is reversed. Then the flow is from the reversing damper port 70 through the duct sections 68, 67, 66, 65, to the lower part of the pressure vessel 10 and then upwardly along the walls of the pressure vessel exteriorly of the duct 16 to the upper end of the pressure vessel. The gases then flow downwardly through the duct and thence to the duct sections 50—58 to the port 45 of the reversing damper construction. From this port, the flow is through the port 72 and to the inlet of the circulating fan 76. The flow of gases is reversed intermittently during stress-relieving procedure to keep temperature gradients within predetermined limits, the temperatures of different sections of the pressure vessel being shown by thermo-couples disposed at spaced positions on the vessel. Excessive temperature conditions around the gas inlet and outlet openings 24 and 60 are particularly avoided by this action.

The combustion chamber 86 is preferably lined with ceramic refractory material and has a ceramic refractory ring 92 around the burner 90. The latter is preferably an oil burner, supplied with primary air by the fan 94.

The construction of the reversing damper assembly is indicated in Fig. 6 of the drawings. It comprises a steel casing 100, having central bearing parts 102 and 104, in which the tube 106 is turnably mounted, with the controller 44 fixed at one end as indicated in Fig. 6. The tube 106 is divided by a central diaphragm 108 into inlet and outlet chambers 110 and 112. These chambers are connected by U-tubes 114—116, which are nested as indicated in the drawing. They are also provided with extended surface elements 120—125, disposed as indicated in Figs. 6 and 7. These elements are effective to mechanically support and thermally maintain the heat resisting refractory material 130, which is pressure molded around them to complete the damper blade. The inlet and outlet chambers 110 and 112 are similarly connected by the U-tubes disposed on their diametrically opposite sides, the tubes being similarly constructed and associated with refractory material to afford the frame work for oppositely extending blades.

At one end of the reversing tube 106 is an inlet 140 for fluid which flows into chamber 110 and thence through the U-tubes to the outlet chamber 112. The fluid passes from this chamber to the outlet 115, and the circulation is maintained to prevent overheating of the damper construction. Overheating of the casing 100 is also prevented by a refractory lining 150, molded against the walls of the casing and having an interior surface closely adjacent to the periphery of the damper.

In the stress-relieving operation, excessive temperature differentials in the metal of the pressure vessel must be avoided, and for this purpose, as well as the control of the temperature changes, the pressure vessel is covered with thermal insulating material before the stress-relieving procedure is begun. The skirt 12, supporting the pressure vessel, is also enclosed with insulation. This insulation may consist of a rock wool blanket securely held against the metal surfaces.

In an illustrative stress-relieving procedure, the pressure vessel is heated slowly and held at a temperature of a range of 1100–1150° F. for a twelve hour soaking period. During such a period, the gases leaving the reversing damper construction may be of the order of 1300 degrees F., and of the order of 1100 degrees F., returning. During both the heating-up and the soaking period, heat increments and gas flow reversals are provided in accordance with the temperatures indicated by thermocouples disposed at various positions on the pressure vessel. The soaking period varies with the wall thickness of the vessel as well as other factors and is usually of several hours' duration. Heat losses during this period, due to gas leakage or other causes, are compensated by intermittent firing of the furnace.

The cooling period of the procedure is then started, and temperatures are lowered at a rate of 30 degrees per hour, flow of the gases being intermittently reversed through the pressure vessel and the rate of furnace firing being varied to control the cooling. During this cooling, the temperature differential between any two points in the vessel is held below 100 degrees F. The temperature is controlled until all points in the pressure vessel are below 300 degrees F. At this time, the gas flow connections, such as those at 24 and 60, at the lower end of the pressure vessel, are removed, and these openings, as well as any others in the pressure vessel, are closed and pressure sealed. When all temperatures are below 160 degrees F., water at 160 degrees F. is placed in the vessel, and hydrostatic test pressure is applied. The hydrostatic test has proven satisfactory to 340 lbs. p. s. i., this pressure being held for four hours.

The apparatus for effecting the illustrative method is claimed in a copending divisional application Ser. No. 29,225, filed on May 26, 1948.

What is claimed is:

1. In a method of manufacture of large pressure vessels, erecting a steel pressure vessel in situ by welding together successive sections, blanketing the pressure vessel with thermal insulation secured thereto throughout its extent, distributing and circulating stress-relieving heating gases through the vessel, and intermittently reversing the flow of the heating gases through the vessel and thereby maintaining the vessel metal temperature gradients within allowable stress-relieving limits.

2. A method of stress-relieving a welded pressure vessel comprising thermally insulating the pressure vessel exteriorly throughout its extent, causing a flow of high temperature heating gas into the pressure vessel and longitudinally thereof, distributing a part of the incoming gas longitudinally of the vessel as the main gas stream flows toward one end of the vessel, circulating the gases by causing them to traverse the vessel longitudinally first in one direction and then oppositely to a position adjacent to their point of entry, and periodically reversing the flow of heating gas within the vessel to avoid excessive temperature gradients in the metal during the stress-relieving operation.

3. In a method of stress-relieving a welded pressure vessel in situ, the method comprising the steps of thermally insulating the vessel externally throughout its extent, heating the vessel by furnace gases from an external source, maintaining the flow of the gases through the vessel until the soaking temperature of the pressure vessel is reached, maintaining the high temperature range of the soaking period for several hours, gradually lowering the temperature of the vessel through a cooling period, and periodically reversing the flow of the furnace gases through the vessel during each of said periods to maintain the predetermined time-temperature schedule of the stress-relieving procedure.

4. A method of stress relieving a welded steel pressure vessel in situ comprising the following steps, circulating gases of progressively higher temperatures through the vessel over a heating up period to bring the vessel to a temperature within the stress relieving range, maintaining the temperature of the vessel within the stress relieving range over a substantial soaking period by similar gas circulation through the vessel, stable temperature conditions within the stress relieving range being achieved during the soaking period, circulating gases of progressively decreasing temperatures through the pressure vessel over a cooling period of substantial extent, periodically reversing the flow of gases through the vessel during all of said periods, and maintaining during all of said periods the temperature gradient in the pressure vessel wall at a value less than 200 F. per foot of pressure vessel length.

5. A method of stress relieving a large welded metallic pressure vessel comprising the following steps, generating heating gases externally of the pressure vessel at a temperature above the stress relieving range for the metal, conducting a high mass flow of the gases from said external source and in a confined continuing stream into the interior of the pressure vessel at a temperature above the stress relieving range of the metal of the vessel, circulating the gases at the specified temperature and causing them to traverse the interior of the pressure vessel from their inlet to their exit from the vessel, retarding and limiting the transfer of heat externally from the pressure vessel, withdrawing the circulated gases in a continued operation from the pressure vessel to maintain circulation of the gases throughout the vessel and the distribution of the heat transfer from the gases to the metal.

CARL A. MAXWELL.
JOHN P. CRAVEN.

REFERENCES CITED

The following references are of record in the file of this patent:

UNITED STATES PATENTS

| Number | Name | Date |
|---|---|---|
| 204,456 | Schreiber | June 4, 1878 |
| 567,011 | Smith | Sept. 1, 1896 |
| 798,023 | Eldred | Aug. 22, 1905 |
| 1,546,532 | Baily | July 21, 1925 |
| 2,229,405 | Currier | Jan. 21, 1941 |